G. V. BLACK.

Universal Joint.

117,733.  Patented August 8, 1871.

Witnesses:
Chas. Nida
Frances McAdds

Inventor:
G. V. Black
Per
Attorneys.

UNITED STATES PATENT OFFICE.

GREENE V. BLACK, OF JACKSONVILLE, ILLINOIS.

IMPROVEMENT IN UNIVERSAL JOINTS FOR SHAFT-COUPLINGS.

Specification forming part of Letters Patent No. 117,733, dated August 8, 1871.

*To all whom it may concern:*

Be it known that I, GREENE V. BLACK, of Jacksonville, in the county of Morgan and State of Illinois, have invented a new and Improved Universal Joint; and I do hereby declare that the following is a full, clear, and exact description thereof, which will enable others skilled in the art to make and use the same, reference being had to the accompanying drawing forming part of this specification.

My invention relates to a new and improved universal joint for shaft-couplings; and it consists in the employment for such couplings of two coiled springs connecting the two shafts either in connection with the jointed forked ends thereof, or of collars thereon or not, one of said coils being smaller and within the other, and coiled in the opposite direction to that of the outer one, and in such relation to the section of the shaft to be turned that the resistance of said shaft will tend to uncoil it and expand it against the outer coil, which is to be arranged to be twisted smaller by the resistance, whereby the tendency of one to be changed from its normal condition will be neutralized by the other, and all the advantages offered by the flexibility of coiled springs for universal joints will be utilized without any of the objections that prevent the practical success of the single coiled spring which, when the resistance takes place, will either coil up the spring more, or uncoil it, according to which way the coil is arranged relatively to the direction in which the shaft turns, and then fly backward or forward when the resistance ceases.

Figure 1:
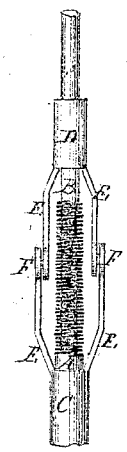
Figure 3:
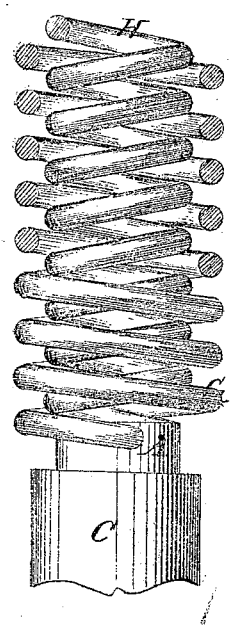
Figure 2:
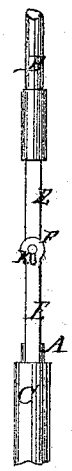

Figure 1 is a side elevation of a couple of shafts jointed together by my improved arrangement of devices. Fig. 2 is a side view taken in a plane perpendicular to that of Fig. 1; and Fig. 3 is an enlarged view, partly in elevation and partly in section, of a part of one of the shafts and the springs.

Similar letters of reference indicate corresponding parts.

A and B are the two shafts to be connected together. C and D are collars or tubes on the shafts, having the forked branches E, which are pivoted together, as at F. G is the outer spiral-spring connection, and H the inner one. Both are connected to each shaft; one is a right-hand coil and the other a left-hand coil. The inner one is so arranged that the tendency of the resistance of the shaft to be driven will be to expand it, and the outer one so that the resistance will tend to contract it, whereby one will control the other, and the two form a connection more capable of overcoming the resistance of the driven shaft, without changing shape or twisting, than a single spring will do. The forked connection of the tubes serves to keep the springs in a line; but they may be dispensed with in some cases. Slotted holes K will be provided for the pins, by which they are jointed together to admit of the universal motion required if the tubes revolve with the shafts; but if said tubes be arranged not to be revolved, as they may, the said slots will not be needed.

Having thus described my invention, I claim as new and desire to secure by Letters Patent—

1. A universal joint for revolving shafts, composed of coiled springs G H arranged one within the other, and with the shafts, and coiled in opposite directions, all substantially as specified.

2. A universal joint for revolving shafts, composed of coiled springs G H and the forked and jointed connection E, all arranged substantially as specified.

GREENE V. BLACK.

Witnesses:
   J. MARCH PATTERSON,
   PRESTON SPATES.